United States Patent [19]

Ducharme, Jr. et al.

[11] Patent Number: 5,451,364
[45] Date of Patent: * Sep. 19, 1995

[54] CELLULOSE FOOD CASING MANUFACTURING METHOD

[75] Inventors: Paul E. Ducharme, Jr., Tinley Park; Edward M. Kajiwara, Park Ridge; Norman A. Portnoy, Clarendon Hills, all of Ill.

[73] Assignee: Viskase Corporation, Chicago, Ill.

[*] Notice: The portion of the term of this patent subsequent to Jan. 11, 2011 has been disclaimed.

[21] Appl. No.: 179,418

[22] Filed: Jan. 10, 1994

Related U.S. Application Data

[63] Continuation-in-part of Ser. No. 822,506, Jan. 17, 1992, Pat. No. 5,277,857.

[51] Int. Cl.⁶ .............................................. B29C 47/88
[52] U.S. Cl. ................................. 264/559; 264/561; 264/562; 264/564; 264/186; 264/203; 264/209.5; 264/210.7
[58] Field of Search ................ 264/559, 561, 563, 187, 264/207, 208, 562, 564, 186, 203, 209.5, 210.7

[56] References Cited

U.S. PATENT DOCUMENTS

| | | | |
|---|---|---|---|
| 2,179,181 | 11/1939 | Graenacher et al. | 106/203 |
| 3,447,939 | 6/1969 | Johnson | 106/135 |
| 4,145,532 | 3/1979 | Franks et al. | 536/56 |
| 4,195,054 | 3/1980 | Verellen et al. | 264/561 |
| 4,246,221 | 1/1981 | McCorsley, III | 264/203 |
| 4,261,943 | 4/1981 | McCorsley, III | 264/187 |
| 4,317,794 | 3/1982 | Gord et al. | 264/559 |
| 4,323,627 | 4/1982 | Joh | 428/398 |
| 4,883,183 | 5/1989 | Vanderberg | 524/35 |
| 5,277,857 | 1/1994 | Nicholson et al. | 264/187 |

FOREIGN PATENT DOCUMENTS

| | | |
|---|---|---|
| 1171615 | 7/1984 | Canada . |
| 2057133 | 6/1992 | Canada ................ 264/187 |
| 494851 | 7/1992 | European Pat. Off. . |
| 494852 | 7/1992 | European Pat. Off. . |
| 218121 | 1/1985 | German Dem. Rep. . |
| 1144759 | 3/1969 | United Kingdom . |

Primary Examiner—Mathieu D. Vargot
Attorney, Agent, or Firm—Roger Aceto

[57] ABSTRACT

In a method for forming a cellulose tube suitable for use as a food casing, in which a solution of nonderivatized cellulose, tertiary amine N-oxide and water is extruded through a die gap and the extruded tube downwardly flowed through an air length while being internally cooled, and passed into a water bath, the tube transverse direction tensile strength is substantially increased by drawing the extruded tube through an air length of at least about six inches.

11 Claims, 4 Drawing Sheets

CELLULOSE FOOD CASING MANUFACTURING METHOD

RELATED APPLICATION

This is a continuation-in-part application of application Ser. No. 07/822506 filed Jan. 17, 1992, now U.S. Pat. No. 5,277,857, in the names of Paul E. DuCharme et al.

TECHNICAL FIELD

The present invention relates to a method of forming a seamless cellulose tube, suitable for use as a food casing, using a solution of nonderivatized cellulose, tertiary amine N-oxide and water.

BACKGROUND OF THE INVENTION

Cellulose food casings are well known in the art and are widely used in the production of stuffed food products such as sausages and the like. Cellulose food casings generally are seamless tubes formed of a regenerated cellulose and contain a plasticizer such as water and/or a polyol such as glycerine. Plasticization is necessary because otherwise the cellulose tube is too brittle for handling and commercial use.

Cellulose food casings generally are used in one of two forms. In one form the casing consists of a tubular film of pure regenerated and non-reinforced cellulose having a wall thickness ranging from about 0.025 mm to about 0.076 mm and made in tube diameters of about 14.5 mm to 203.2 mm. The second form is a reinforced casing wherein the tubular wall of the casing consists of a regenerated cellulose bonded to a paper web. Such reinforced casings are commonly called "fibrous" casings to distinguish them from the nonreinforced cellulose casings. Fibrous casings have a wall thickness in the range of 0.050 mm to 0.102 mm thick and are made in diameters of about 40.6 mm to 193 mm or greater. This invention relates to manufacture of the non-reinforced type of cellulose casing hereinafter referred to simply as "cellulose casing".

The cellulose for making this casing is most commonly produced by the so called "viscose process" wherein viscose, a soluble cellulose derivative, is extruded as a tubular film through an annular die into coagulating and regenerating baths to produce a tube of regenerated cellulose. This tube is subsequently washed, plasticized with glycerine or other polyol, and dried. Drying usually is accomplished while the tube is inflated with air at a pressure sufficient both to maintain a constant tube diameter and to orient the film.

The viscose process for making cellulose is well known in the art. Briefly, in the viscose process a natural cellulose such as wood pulp or cotton linters first is treated with a caustic solution to activate the cellulose to permit derivatization and extract certain alkali soluble fractions from the natural cellulose. The resulting alkali cellulose is shredded, aged and treated with carbon disulfide to form cellulose xanthate which is a cellulose derivative. The cellulose xanthate is dissolved in a weak caustic solution. The resulting solution or "viscose" is ripened, filtered, deaerated and extruded. The pulp source and time of aging the alkali cellulose are selected depending upon whether the viscose will be used to make fibrous casing or nonreinforced cellulose casing. For extrusion of a nonreinforced cellulose casing, the selection is such that a relatively more viscous solution is used.

The viscose is extruded as a tube through an annular die and about a self centering mandrel into coagulation and regenerating baths containing salts and sulfuric acid. In the acidic baths the cellulose xanthate, e.g. viscose, is converted back to cellulose. In this respect, the acid bath decomposes the cellulose xanthate with the result that a pure form of cellulose is coagulated and regenerated. Initially, the coagulated and regenerated cellulose is in a gel state. In this gel state the cellulose tube first is run through a series of rinse water dip tanks to remove by-products formed during regeneration. The gel tube then is treated with a glycerine humectant and dried to about 10% moisture based on total casing weight. As noted above, the gel tube is inflated during the drying process to a pressure sufficient to provide a degree of orientation to the dried cellulose tube.

During regeneration of the cellulose from the xanthate solution, sulfur products are liberated and gases such as hydrogen sulfide, carbon disulfide and carbon dioxide are released through both the inner and outer surfaces of the gel tube. It should be appreciated that the gases produced as by-products during regeneration are noxious and toxic so their containment and recovery imposes a considerable burden on the manufacturing process. Moreover, gases generated at the internal surface of the extruded tube can accumulate within the tubular casing and consequently present special problems. The tubular casing while in its gel state is expansible and the pressure build up of gases accumulating within the gel casing causes undesirable diameter variations. To prevent this, the gel casing is punctured periodically to vent the accumulated gases. This puncturing process, involving procedures to puncture, vent, and then seal the punctured gel tube, results in an undesirable interruption of the manufacturing process. Also, gases which evolve within the casing wall may become entrapped causing bubbles which weaken the casing and detract from its stuffability and performance.

Also, the casing in its gel state to some extent retains low residual levels of the sulfur compounds produced during regeneration. While care is taken to remove all residual sulfur compounds by washing the gel tube prior to drying, the dried casing may still contain trace amounts of these compounds.

Despite the problems inherent with the viscose process as described above, it nevertheless remains today as the most commonly used process for the production of cellulose casing for the food processing industry.

An alternate cellulose production method involves forming a cellulose solution by means of a simple dissolution rather than requiring prior derivatization to form a soluble substance (as in the viscose process). A cellulose dissolution process is described in U.S. Pat. No. 2,179,181. This patent discloses the dissolution of natural cellulose by a tertiary amine N-oxide to produce solutions of relatively low solids content, for example 7 to 10% by weight cellulose dissolved in 93 to 90% by weight of the tertiary amine N-oxide. The cellulose in the resulting solution is nonderivatized prior to dissolution. U.S. Pat. No. 3,447,939 discloses use of N-methylmorpholine-N-oxide (NMMO) as the tertiary amine N-oxide solvent wherein the resulting solutions, while having a low solids content, nevertheless can be used in chemical reactions involving the dissolved compound, or to precipitate the cellulose to form a film or filament.

More recent patents such as U.S. Pat. Nos. 4,145,532 and 4,426,288 improve upon the teachings of the '939 Patent. U.S. Pat. No. 4,145,532 discloses a process for making a solution of cellulose in a tertiary amine oxide such as NMMO which contains 10–35% by weight of cellulose. This higher solids content, achieved in part by including an amount of water (from 1.4% to about 29% by weight) in the tertiary amine oxide solvent, provides a solution adapted for shaping into a cellulosic article such as by extrusion or spinning. In U.S. Pat. No. 4,426,288 the NMMO-cellulose solution contains an additive which reduces decomposition of the cellulose polymer chain so that molding or spinning substances are obtained with only slight discoloration and which will yield molded shapes distinguished by improved strengths upon precipitation in a nonsolvent such as water.

Using NMMO as a solvent for cellulose eliminates the need for derivatizing the cellulose, as in the viscose process. Consequently it eliminates the disadvantages attendant to the viscose process such as the problems associated with the generation of toxic and noxious gases and sulfur compounds.

However, while nonderivatized cellulose resulting from the process of dissolving cellulose in NMMO eliminates certain problems associated with the viscose process, to applicants' knowledge, NMMO-cellulose solutions heretofore have not been used in the manufacture of cellulose food casings. This perhaps is due in part to the fact that the nonderivatized cellulose solution is thermoplastic with a melting point of about 65° C. so it is normally solid at the temperature heretofore used in the extrusion of viscose (e.g. cellulose xanthate) for producing cellulose food casings.

Cellulose dissolution generally occurs by four methods: it behaves as an electron donor base, or an electron acceptor acid, or complexes with another reagent, or forms a derivative in which the cellulose is covalently bonded through alcohol groups with various reagents to form new molecules. The latter includes sodium cellulose xanthate, ie. cellulose being an alcohol can react to make esters such as xanthate derivative which is soluble in aqueous, nonaqueous or strongly polar organic solvents. The solubilization is mainly due to the disrupting of the hydrogen bonding by the derivative bonds. The salient feature of this step is that the derivatizing groups can be easily removed by hydroxylic materials such as, for example, aqueous acid to yield pure cellulose. In this type of dissolution the cellulose is truly regenerated whereas in the first three mentioned types of dissolution the cellulose is mainly precipitated or coagulated, ie. reorganized into a shape. Notwithstanding these differences, the resulting cellulose article is chemically identical irrespective of whether it is reprecipitated from solutions or chemically regenerated.

It is speculated that another reason why nonderivatized cellulose has not been commercially used in manufacture of food casings is that the solution at 65° C. has a viscosity significantly higher than the viscosity of the derivatized cellulose heretofore used in the production of cellulose food casings. In particular, nonderivatized cellulose in solution may have a molecular weight of about 80,000 to 150,000 and a viscosity in the range of about 1,000,000 to 3,500,000 centipoises. The high molecular weight and viscosity is because the dissolution of the cellulose does not affect the degree of polymerization. Viscose for casing manufacture (wherein the degree of polymerization is affected by the derivatization process) has a molecular weight in the range of about 95,000 to 115,000 for nonfibrous casing and a viscosity of 5,000 to 30,000 centipoises.

From a cellulose article manufacturing process standpoint these differences are important because after dissolution the process steps (including cellulose recovery) are dependent on whether cellulose has entered into a covalent bond with the solubilizing reagent, i.e., has been derivatized. This is so in the case of the well-known and commercially practiced viscose process. When a cellulose derivative is processed into the shaped article, the derivative such as viscose is first partially coagulated in the extrusion bath and then subsequently hydrolyzed back to cellulose, i.e., cellulose is regenerated. During this hydrolysis and while the derivative is still in a "plastic" state, the reforming cellulose crystallites can be stretched and oriented to give desirable commercial properties such as high tensile strength or burst strength. However, a disadvantage of this general approach is that since a cellulose derivative has been hydrolyzed, additional byproducts are formed. This significantly complicates cellulose recovery.

By contrast in the nonderivative cellulose dissolution methods such as NMMO/$H_2O$, orienting the cellulose molecules during the reorganization of the cellulose article is more difficult because there is no covalent bond to break. So reorganization is essentially a physical dilution or decomplexation. However recovery is less complex and, at least in the cellulose/NMMO/$H_2O$ system, commercially feasible.

The prior art such as McCorsley III U.S. Pat. No. 4,246,221 and East German Patent No. DD 218 121 has taught that such nonderivatized cellulose containing mixtures with NMMO and water may be forced through a nozzle and longitudinally guided through a 12 inch long air gap into a precipitating bath to form very small diameter solid fibers. More recently the nonderivatized cellulose fiber spinning prior art teaches that such long air path lengths should be avoided. As for example stated in Jurkovic et al U.S. Pat. No. 5,252,284, a long air gap leads to sticking of the fibers, uncertainties in spinning and fiber breakage at high degrees of drawing. According to Jurkovic et al, by using selected orifice diameters and nozzle channel lengths, the air gap is desirably reduced to at most 35 mm (1.4 inches).

It will be appreciated by those skilled in the art that manufacture of individual solid cellulose fibers by extrusion through orifices of 2–4 mils diameter is nonanalogous to manufacture of cellulose food casings which are extruded as a hollow tube of at least about 700 mils inside diameter with wall thickness typically on the order of 40 mils.

U.S. patent application Ser. No. 07/822,506 filed Jan. 17, 1992 in the names of Paul E. DuCharme et al and issued on Jan. 11, 1994 as U.S. Pat. No. 5,277,857 discloses a method of and apparatus for manufacturing cellulose food casing from a solution comprising nonderivatized cellulose, NMMO and water, and the specification of the DuCharme et al application is incorporated herein by reference.

According to the DuCharme et al invention, it was unexpectedly discovered that nonderivatized cellulose solutions are suitable for use in making both cellulose and fibrous food casings. Nonderivatized cellulose in a molten state can be extruded as a tubular film into a nonsolvent liquid such as a water bath. For purposes of this specification "nonderivatized" cellulose means a cellulose which has not been subjected to covalent bonding with a solvent or reagent but which has been dissolved by association with a solvent or reagent through Van der Waals forces such as hydrogen bonding. "Nonsolvent" means a liquid which is not a cellulose solvent. In the water bath, the nonderivatized cellulose precipitates and the resulting gel tube can be treated with water, a polyhydric alcohol such as glycerine, or other water soluble softening agent such as a polyalkylene oxide or a polyalkylene glycol prior to drying.

More specifically, in the manufacturing method of the DuCharme et al application the following steps are employed:
(a) providing a solution comprising nonderivatized cellulose in an amine oxide solvent;
(b) downwardly extruding the solutions from an annular orifice to form a seamless tube of at least 14.5 mm diameter;
(c) passing the extruded seamless tube of solution downwardly from the orifice first through an air gap and then into a bath of nonsolvent liquid;
(d) introducing a nonsolvent liquid into the interior of said extruded seamless tube at a location below the annular orifice and above the surface of the bath of nonsolvent liquid;
(e) downwardly flowing the nonsolvent liquid concurrently with the inner surface of said downwardly moving extruded seamless tube of solution and into said bath as the tube moves through said air gap, and contacting the inner surface of said extruded seamless tube with nonsolvent liquid in the course of said concurrent flows to precipitate nonderivatized cellulose at said inner surface from said solution;
(f) maintaining said extruded seamless tube of solution in said bath with its inner and outer surfaces in direct contact with said nonsolvent liquid thereby further precipitating said nonderivatized cellulose from said solution and forming a nonderivatized cellulose tube; and
(g) removing said nonderivatized cellulose tube from said bath and contacting same with a water soluble softener.

The nonderivatized cellulose food casings prepared by the teachings of the DuCharme et al invention are somewhat limited in the sense that their tensile strength properties are not equivalent to those of commercially employed viscose-derived cellulose casing. More particularly, based on a flat width of about 2.24 inches and wall thickness of about 0.80 mil, the machine direction (MD) tensile strengths of the NMMO-based nonderivatized cellulose tube prepared according to the teachings of DuCharme et al is about 3.77 lbs/inch·mil, and the MD tensile strengths of a viscose-derived NOJAX type cellulose food casing manufactured and sold by Viskase Corporation is about 4.18. So from the MD tensile strength standpoint, the two casings are comparable.

However, the transverse direction (TD) tensile strength of the NMMO-based nonderivatized cellulose tube is about 1.60, whereas the NOJAX cellulose tube has TD tensile strength of about 3.15. It will be apparent from the foregoing that the former's TD strength is limiting and further that the NMMO-based nonderivatized tube does not have balanced tensile strengths, i.e. the MD/TD is about 3.76 in contrast to the balanced NOJAX food casing tensile strength where the MD/TD ratio is about 1.33.

An object of this invention is to provide an improved method of forming a seamless cellulose tube (suitable for use as a food casing) from a solution comprising nonderivatized cellulose, tertiary amine N-oxide and water.

Another object is to provide such an improved method from a nonderivatized cellulose-NMMO-water solution yielding a cellulose tube with TD tensile strength of at least about 2.0.

A further object is to provide such an improved method yielding a cellulose tube with both MD and TD tensile strengths of at least about 2.5 and an MD/TD tensile strength ratio below about 2.

SUMMARY OF THE INVENTION

In particular, this invention relates to an improvement to a method of forming a seamless cellulose tube of nonderivatized cellulose suitable for use as a food casing of 0.80–1.20 mils wall thickness, wherein a solution comprising nonderivatized cellulose, tertiary amine N-oxide and water at temperatures below about 235° F. (113° C.) is downwardly extruded through a die gap at a flow output of at least about 20 lbs/hr and at least about 2 lbs/hr cellulose (bone dry basis) to form an extruded tube. The latter is longitudinally passed through an air path length (air gap length) and internally cooled by a refrigerant in said air length. The so-cooled tube is then passed through a water bath at a draw ratio of at least 3 and emerges as a wet tube which is inflated, longitudinally and transversely expanded and dried in the expanded state to form the cellulose tube of 0.80–1.20 mils wall thickness.

The particular improvement of this invention to the aforedescribed method comprises drawing the extruded tube through an air length (air gap) of at least about six inches in length so as to form the cellulose tube with high transverse direction tensile strength. It will be demonstrated by comparative data with substantially lower air path lengths that this invention provides cellulose tubes with TD tensile strength of at least about 2.0 lbs/in·mil and a MD/TD tensile strength ratio not exceeding about 2.

As used herein, all cellulose tensile strengths are measured "wet" which is usually a more stringent test than "dry" tensile strength. For this measurement, the tube sample is first immersed in tap water at room temperature for 20 minutes before the tensile strength measurement. The test is performed on an Instron Table Model Tensile Testing Machine (or equivalent) of the constant rate-of-jaw separation type using a method derived from ASTM D-882. The specific procedure is as follows:
1) Cut six samples 2 inches long machine direction (MD) ×1 inch long transverse direction (TD), and identify as MD.
2) Cut six samples 1 inch long MD × greater than 1 inch long TD, and identify as TD.
3) Measure thickness of samples with a micrometer having a range up to 0.1 inch and accuracy of 0.0001 inch, basing measurement on minimum thickness (the weakest point).
4) Soak samples in room temperature water for 20 minutes.
5) Measure flat width of wet samples as well as their thickness in the same manner as 3).
6) Set the Testing Machine crosshead speed and the chart speed at 20 inches/minute.
7) Set the gauge length at 1 inch and zero the pen.

8) Calibrate the Testing Machine to a full scale load of 20 lbs.
9) Clamp the specimen squarely between the jaws.
10) Run the crosshead down until the specimen ruptures.
11) Calculate the specimen tensile strength in lbs/inch-·mil thickness in accordance with the following formula:

$$\text{tensile strength} = \frac{\text{Force (lbs)}}{\text{width (in.)} \times \text{thickness (mils)}}$$

where:  Force = No. at sample rupture
        Width = Sample width (1 inch)
        Thickness = Sample gauge ( mils)

12) Calculate the arithmetic average of six tensile strength readings for MD and the six readings for TD. These are the values reported hereinafter in Tables A and B.

Other objects and advantages of this invention will be apparent from the ensuing detailed disclosure and appended claims.

DETAILED DESCRIPTION OF THE INVENTION

The relatively long air path length method of this invention was demonstrated in a series of tests also using for comparative purposes, short air gap lengths. The physical properties of the resulting-NMMO-derived cellulose food casings were then measured and are compared herein.

In all of these experiments the starting material was a blend of "dope" in the form of a yellow/brown solid having a melting point of 60°–70° C., and was obtained from Courtaulds Research Ltd. Coventry, England. The Material Safety Data Sheet for the dope identifies it as containing, by weight, 70–80% NMMO, 10–20% cellulose and 5–15% water. It is believed the dope as supplied is made according to processes described in U.S. Pat. Nos. 4,145,532; 4,196,282 and 4,255,300 the disclosures of which are incorporated herein by reference. The dope, received as slabs, was ground to a particle size of less than about 1.58 mm, i.e. ⅟₁₆ inch, in diameter.

Water in the dope solution probably weakens the cellulose-to-cellulose hydrogen bonding enough so that the NMMO molecule, which by itself would not be strong enough to rupture a cellulose hydrogen bond from another cellulose molecule, can wedge between and solvate the cellulose chains. This causes plasticization and with sufficient heat, time and mechanical shearing, dissolves the cellulose. This action may possibly also be provided by hydroxylic molecules other than water, as for example methanol and formamide. In principle, a method analogous to the present invention could be developed using a dope containing either no water or substantially reduced water. However, recovery of the expensive NMMO for recycling would be very complicated by addition of a third component to the dissolving medium.

Figure 1:
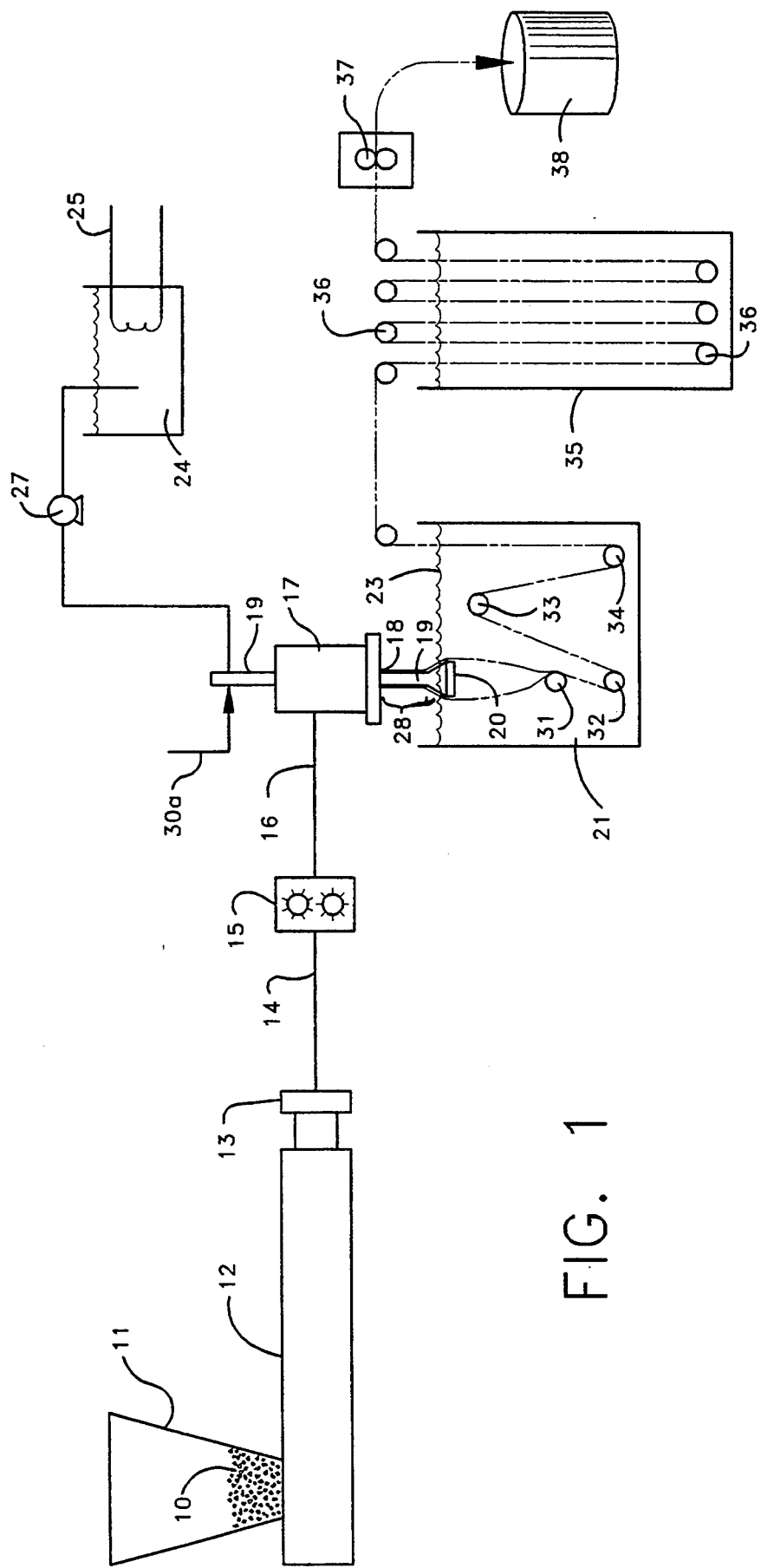
FIG. 1 is a schematic flowsheet drawing of a first pilot plant used to manufacture the NMMO-derived cellulose food casing described in Example 1.

Referring now to FIG. 1, the ground dope particles 10 are fed through funnel 11 to extruder 12 which may be the general purpose single screw type designed for polyethylene, as for example the 1½ inch diameter screw in a 30 inch long barrel having a 20:1 L/D ratio (manufactured by Aetna Davis Company in about 1959) used in the Examples 1 and 2 tests. As operated in this process, the extruder has three electrically heated elevated temperature zones and the zone temperatures (beginning at the inlet end) were set at 190° F. (first zone), 240° F. (second zone) and 240° F. (third zone and discharge end). The actual dope temperature is slightly lower than these zone temperatures.

The molten cellulose-NMMO-water mixture (dope) discharged from extruder 12 must be sufficiently hot to be free of rheological defects caused by regional temperature variations, and in practice a temperature of at least about 200° F. is required. On the other hand the extruded dope should not be so hot as to increase the kinetics of dope decomposition which is accompanied by depolymerization of the cellulose and darkening of the dope. Dope decomposition also negatively impacts the commercial practice of this invention by causing NMMO recovery economics to suffer. In addition, dope decomposition has been linked to process upsets. Accordingly suitable molten dope temperatures may range from about 200° F. to about 240° F.

The extruded dope is flowed through screen pack section 13 to remove any particulate matter from the molten dope stream and thereby prevent any unmelted dope from proceeding downstream into the die section. As well understood in the art, multiple screens of different mesh sizes are used to perform this function. In the Example 1 tests, five screens were used in a sequential mesh profile of 60/200/325/200/60. The highest mesh number corresponds to the smallest sieve opening of 44 microns (0.044 mm). Like extruder 12, screen pack section 13 may be electrically heated and in the instant process is typically maintained at about 240° F.

The fully molten dope is flowed through electrically heated conduit 14 to heated melt pump 15. The latter may for example be a Zenith Model HLB with a capacity of 30 cc per revolution. By way of operating characteristics, an output of 20 pounds melt per hour required a melt pump RPM of 5. This pump is electrically heated and maintains the melt at temperatures of 190°–200° F. The molten blend of nonderivatized cellulose-NMMO-water is discharged from melt pump 15 into electrically heated conduit 16 and flows to die assembly 17 which for example may be the triple feed, triple spiral type well-known to those skilled in the art. The molten blend is downwardly extruded through die assembly 17 and is discharged from annular orifice 18 to form a seamless tube T of at least 14.5 mm diameter.

Figure 2:
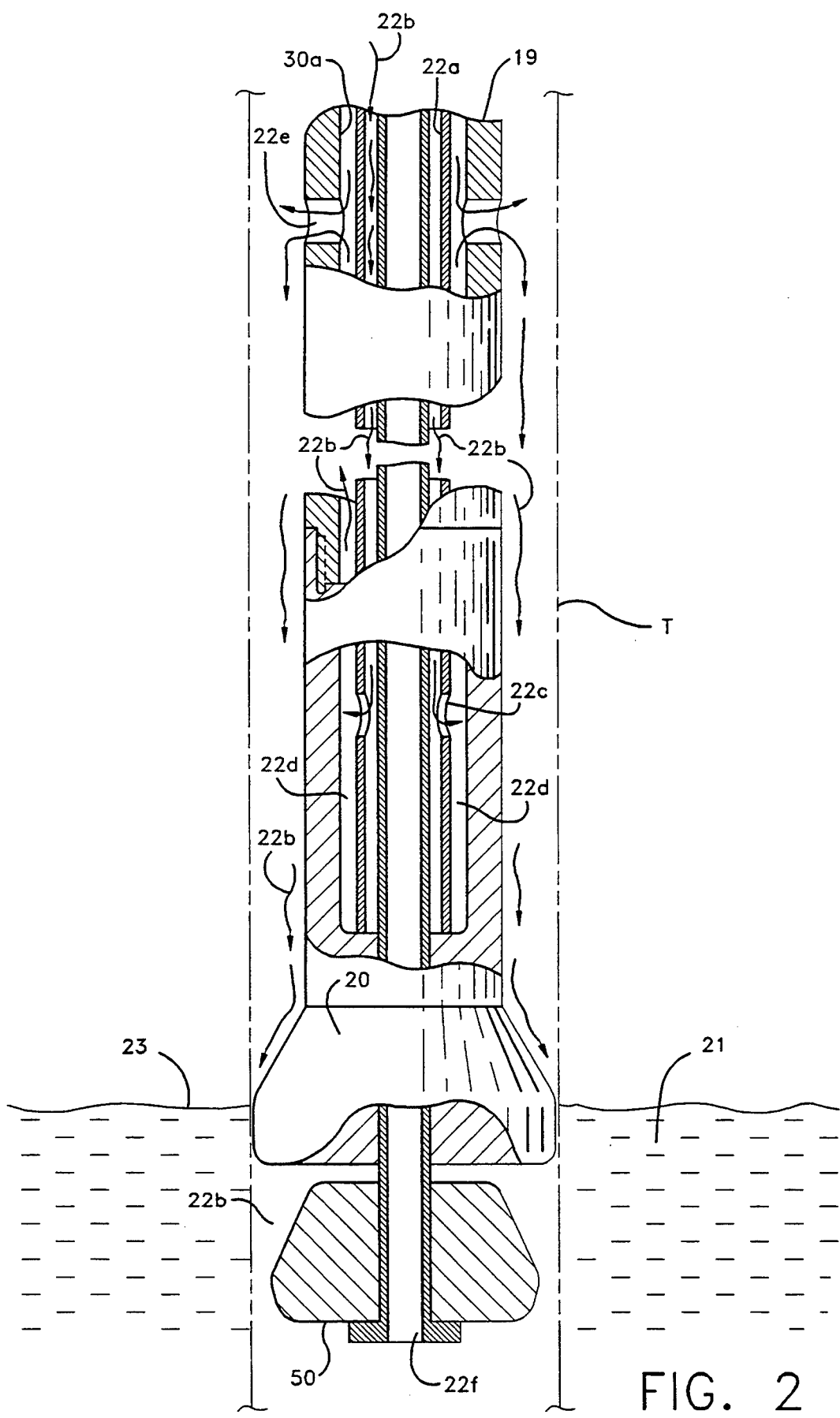
FIG. 2 is an enlarged elevation view taken in cross-section of the extruder-mandrel-first bath section of the FIG. 1 system, showing the extrudate flow and tube movement through the extended air path and into the first bath.

As shown more clearly in FIG. 2, the extruded seamless tube T moves downwardly and passes over the outer surface of mandrel 19 having enlarged lower end 20, and into first bath 21 of nonsolvent liquid, for example water. As used herein, "nonsolvent liquid" means a liquid which is not a solvent for cellulose. During this movement another nonsolvent liquid, for example a solution of 30% NMMO and water, is introduced into the interior of the extruded seamless tube T. Such introduction is accomplished by flowing the liquid through longitudinal inner passage 22a in the mandrel as a downwardly moving nonsolvent liquid stream as represented by arrows 22b. This liquid stream 22b then flows out of the mandrel inner longitudinal passage 22a through transverse wall openings 22c into mandrel outer passage 22d for upward flow to transverse orifices 22e in the mandrel wall and inside the extruded tube T. These transverse orifices 22e are located below the annular die orifice 18 and above the surface 23 of first bath 21. The liquid stream 22b then flows downwardly on the mandrel outer wall. In the course of this flow down on the mandrel 19 the stream 22b contacts the inner surface of the extruded tube T to provide what is hereafter referred to as an "internal bath". The "internal bath" 22b is introduced from external supply container 24 maintained at controlled temperature by cooling means 25 (FIG. 1). For Example 1 the internal bath temperature was controlled within a range of either 35°–40° F., 50°–55° F. or 65°–70° F. The liquid comprising the internal bath is transferred from supply container 24 through conduit 26 by pump 27 to an opening (not illustrated) communicating with mandrel passage 22a.

As explained more fully in the previously referenced DuCharme et al application, the nonsolvent liquid forming internal bath 22b flows downwardly and cocurrently with the inner surface of the downwardly moving extruded seamless tube T of nonderivatized cellulose-NMMO-water and into the first bath 21 as the extruded tube moves through the air path length (air gap) 28. As used herein the latter comprises the longitudinal distance between die opening 18 and the first bath surface 23.

One function of first bath 21 comprising nonsolvent liquid such as water, is to harden tube T by densifying and regenerating the cellulose. The bath also draws out NMMO from immersed tube T. If first bath 21 contains NMMO this relatively expensive material must be recovered and recycled for efficient operation of the overall process. For this reason the first bath perferably contains at least 15 wt.% NMMO. Moreover, it has been experimentally determined that the presence of limited concentrations of NMMO in first bath 21 improves the tensile strength properties of tube T, although concentrations above 50 wt.% adversely affect these properties. Accordingly, a preferred concentration of NMMO in first bath is between about 15 and about 50 wt.%, with water comprising the balance.

The present invention is based on the discovery that when this air path length is increased from a relatively short distance suggested by the DuCharme et al application, as for example 50 mm (1.97 inches), to at least about 6 inches, the cellulose tube's TD tensile strength is substantially increased and approaches the tube's MD strength, so that the MD/TD tensile strength ratio preferably does not exceed about 2 and most preferably does not exceed about 1.5. As illustrated in FIG. 2, the internal bath 22b of nonsolvent liquid contacts the inner surface of the extruded tube T in the course of their cocurrent flow. In this manner, the extruded tube T of nonderivatized cellulose is cooled and non derivatized cellulose is precipitated at the tube inner surface from the tube solution mixture. That is, the internal bath 22b coagulates the solution tube T from the inside, since the nonsolvent bath composition is relatively low in solvent content (compared to the tube itself). However, the internal bath also lubricates the mandrel outer surface and prevents the downwardly moving tube solution from adhering to the mandrel, so it preferably contains 30–50% NMMO (by weight). This lubricating flow facilitates passage of the extruded tube T over the mandrel 19 and in particular its enlarged lower end section 20. The internal bath also prevents the tube solution film from blocking to itself. Since the first bath liquid level 23 is maintained above the lowermost end of the enlarged section 20 of the mandrel but does not immerse the entire length of this section, the internal bath is concentrically discharged from the space between cellulose tube inner surface and the mandrel outer surface and enters into that volume within the extruder tube T which is below the bath liquid level 23. Instead of mixing with the first bath, the internal bath 22b may for example be upwardly withdrawn through another passage 22f in the mandrel and the connecting die to the outer end thereof for recovery of NMMO by separation from water (not illustrated).

Although the internal bath is the preferred method of internally cooling the extruded solution tube in the air path length, this internal bath could also be supplemented by other cooling means as for example a closed circuit refrigeration system positioned between the mandrel outer surface and the tube inner wall.

Returning now to operation of the die-mandrel assembly, gas such as air is used during start-up to inflate the extruded solution tube as it drops from annular orifice 18 and passes over the mandrel 19. This is accomplished by introducing slightly pressurized air through conduit 30a into the die 17. This conduit communicates through the joining mandrel 19 to transverse openings 22e into the interior of the extruded tube to increase its diameter and counteract the natural neck-in tendency of the tube. Only short bursts of air are required and the air pressure is typically less than 2 inches water. Occasionally air is introduced during the extrusion operation to slightly increase the solution tube diameter and/or lower the level of the internal bath that has developed above the enlarged lower end 20 of the mandrel.

Beneath the enlarged lower end 20 of mandrel 19, spreader element 50 is attached to guide tube T in first bath 21 before it reaches first roll 31. This is used to prevent wrinkles or creases in tube T which can significantly (and undesirably) increase the amount of internal bath caused to flow longitudinally forward in the system through the first bath. Spreader 50 used in the Example 1 tests had a conical end-to-end shape and circular transverse shape. It had an overall length of 0.50 inch, an upper end narrow diameter 0.50 inch and a lower end wide diameter of 1.10 inches.

For Example 1, the first bath 21 (in a container 2 feet long ×1.5 feet wide ×1.5 feet high of about 30–35 gallons capacity) consisted of 97% water and 3% NMMO at temperatures of 54°–82° F., depending on the supply temperature which was not controlled. It contained four rolls which were all belt driven by a single motor (not illustrated) at the same RPM. As shown in FIG. 1 first and second rolls 31 and 32 were one inch diameter, and third and fourth rolls 33 and 34 were two inches diameter. The roller speed was not measured but the speed was adjusted to eliminate any slacking. These rolls were longitudinally aligned with their axes of rotation normal to the longitudinal movement of the tube T from end-to-end of first bath 21. The top of first roll 31 was located 1–4 inches beneath the bottom end of mandrel 19, and second roll 32 was positioned directly beneath first roll 31 with its top surface about one inch below the first roll bottom surface. This created an "S" wrap of the tube T as illustrated by dotted lines, to hinder the internal bath from being carried forward with the first bath. The third roll 33 was positioned in the center of first bath (relative to the longitudinal direction of tube movement) and slightly higher than first roll 31. This position allowed for slightly more tube travel in the first bath and also increased the wrap angle on the second and third rolls 32 and 33. The fourth roll 34 was located at the opposite end of first bath 21 from the first and second rolls 31–32, with its lower surface about two inches above the tank bottom.

As previously explained, in Example 1 the first bath liquid level was maintained above the mandrel enlarged lower end but never above the largest diameter portion of the mandrel. The latter's main upper section was 0.625 inch outside diameter with the enlarged lower end section 20 being about 0.60 inch long beginning with a 30° outward taper to a maximum diameter of 1.50 inches which is 0.300 inch long. Since the extruded cellulose tube T diameter was less than or equal to the mandrel enlarged end section, the latter transversely stabilized the tube. In operation a minimum level of internal bath was maintained above the mandrel enlarged end section. Processwise, NMMO solvent release and coagulation of the cellulose tube began immediately on contact with the internal bath. For all mandrel lengths the internal bath 22b was introduced through inner passage 22a to transverse openings 22c and into passageway 22d for upward flow therein to four concentrically spaced 0.125 inch diameter transverse orifices 22e in the mandrel wall, located about 1 inch below the die annular orifice 18. The flow of the internal bath is downwardly on the mandrel outer surface and within the downwardly moving extruded tube T. For casing production rates of between about 10 and about 60 linear feet per minute, the internal bath flow rate through these orifices 22e and onto the mandrel outer surface was about 60 to about 100 millimeters/min. It was observed that although initially the extruded solution tube T had little strength, the effect of the internal and first baths on the solution tube wall was enough to allow the tube T to be laced through the rolls in the first bath. By the time the tube exited the first bath, the increase in strength and NMMO solvent removal was visibly noticeable.

Although not practiced in the working Examples 1 and 2 of this invention, those skilled in the art understand that for efficient operation NMMO can and should be recovered from the first bath for recycling in a commercial operation. This may be done by standard unit operations as for example fractional distillation.

From the first bath, the extruded tube T is moved into a second bath 35. The purpose of second bath 35 is to continue the direct contact between nonsolvent liquid, eg. water, and the precipitating cellulose-containing tube T so as to further precipitate the nonderivatized cellulose from solution and form a nonderivatized cellulose tube. In the Example 1 system the second bath was water in the same temperature range as the first bath (uncontrolled). The tank holding the second bath was about 70 gallons capacity and was 18 inches long ×18 inches wide ×48 inches deep. As illustrated, there were sufficient freely rotating rolls 36 of 2.5 inches diameter to provide three additional top-to-bottom dips for the tube in water.

Any NMMO in the internal bath carried forward in tube T through first bath 23 into second bath 35 may be recovered by periodically piercing the moving tube and allowing the solution to migrate into the second bath. If desired, any NMMO released into the second bath may be recovered.

Following the second bath washing step, the cellulose tube is pulled out by means of mechanically-driven nip roll 37 and for Example 1, samples were collected in a quiescent water soak bath 38 for overnight storage at ambient temperature. Sections of each sample were then further washed on a table by running water through the inside of the tube for about 20 minutes. The samples were visually examined for pinholes and if any were detected, the sample was discarded. Following washing, the cellulose tube samples were soaked in a 10% glycerine/90% water solution for at least 10 minutes.

For drying, the samples of about 120 inches length were connected to an air manifold and generally horizontally positioned on a bench but inclined so that water within the tube would gravitate away from the air manifold. The low end of the tube sample was then draped over the end of the bench, a knot tied in the tube lower end and a weight (less than about one lb) attached to the knotted end to provide machine direction drying tension. Air was used to inflate the tube to a pressure of 30 inches water. This drying was performed at ambient conditions for a period of about three hours.

EXAMPLE 1

In this series of five runs using the FIG. 1 and 2 system, nonderivatized cellulose tubing was produced using cellulose-NMMO-water dope feed at about the same temperature (205° F. for run 1 and 210° F. for runs 2–5), the same extruder die gap (40 mils) and the same die output rate (21 lbs/hr). The inside and outside diameters of the die were 0.866 inch and 0.946 inch, respectively. The mandrel diameter was 1.5 inches at its lower end 20. The key difference was the air path length, i.e. for runs 1 and 2 the length was 3 inches whereas in runs 3, 4 and 5 the length was 6 inches. There were variations in other operating parameters (internal bath temperature and composition, the nip roll pull rate of the tube, and the tube draw ratio) but they do not significantly affect the tensile properties of the resulting tubes as set forth in Table A As used herein and listed in Table A, "draw ratio" is the ratio of the linear velocity of the tube being pulled through the first bath to the linear velocity of the dope solution tube exiting the die. By way of illustration, if we assume a 30 mil die gap and a 0.75 inch inside die diameter, the open die area is 0.0735 $inch^2$. Then if we assume 20 lbs/hr. dope output from the die and 1.15 grams/$cm^3$ dope melt density the volumetric dope flow is 8.02 $inch^3$/minute and the dope velocity exiting the die is 9.1 feet/minute. If the first bath roll speed is 45.5 feet/min, the draw ratio is 45.5/9.1 = 5.

Also as used herein, "pull rate" is the speed of the first bath rolls so that in the above illustration the pull rate is 45.5 feet/min.

As noted in Table A, the cellulose output rate from the die was 3.15 lbs/hr. From this Example 1 and other runs, we believe the advantages of the instant method may be realized at cellulose output rates as low as about 2 lbs/hr.

TABLE A

| Run No. | Air Path Length Ins. | Dope Temp. Deg. F | Dry Film Thk. Mils | MD Str. Pim(f) | TD Str. Pim(f) | Ratio MD/TD | Die Gap Mils. | Die Output Lbs/Hr(g) | Draw Ratio |
|---|---|---|---|---|---|---|---|---|---|
| 1(a) | 3 | 205 | 0.81 (MD) 0.72 (TD) | 3.76 | 1.61 | 3.76 | 40 | 21 | 3.2 |
| 2(b) | 3 | 210 | 1.3 (MD) 1.43 (TD) | 2.62 | 1.66 | 1.58 | 40 | 21 | 2.8 |
| 3(c) | 6 | 210 | 1.55 (MD) 1.28 (TD) | 3.09 | 1.99 | 1.55 | 40 | 21 | 3.3 |
| 4(d) | 6 | 210 | 2.93 (MD) 2.35 (TD) | 2.77 | 2.70 | 1.03 | 40 | 21 | 3.7 |
| 5(e) | 6 | 210 | 1.75 (MD) 1.60 (TD) | 3.22 | 2.25 | 1.43 | 40 | 21 | 4.0 |

(a)internal bath; 70° F., 50% NMMO-50% $H_2O$; first bath: 75° F., 3% NMMO-97% $H_2O$; second bath: 65° F., 100% $H_2O$; die gap: 40 mm; tube pull rate: 38 ft/min. "Pull rate" is the speed of nip roll 37, i.e., the velocity of tube T being drawn out of die 17.
(b)same as (a) except internal bath: 32° F. and tube pull rate: 35 ft/min.
(c)internal bath: 68° F., 30% NMMO-70% $H_2O$; first bath: 68° F., 0% NMMO-100% $H_2O$; second bath: 65° F., 100% $H_2O$; die gap: 40 mm; tube pull rate: 40 ft/min.
(d)same as (c) except tube pull rate: 44 ft/min.
(e)same as (c) except tube pull rate: 48 ft/min.
(f)Pim means lbs/inch · mil thickness of tube wall
(g)Since cellulose comprises 15% output, cellulose flow rate is 3.15 lbs/hr.

Table A shows that the TD tensile strengths of tubes from runs 3–5 are all substantially higher than run 1 and 2 tubes. Moreover the MD tensile strengths of tubes 3–5 were all above 2.5 lbs/inch.mil and the MD/TD ratios did not exceed about 1.6. The improved TD tensile strength and relatively balanced biaxial tensile strength properties of tubes 3–5 result from the air path length of 6 inches (compared to 3 inches). This observation, that increasing the length to at least 6 inches causes substantial increases in the TD strength, is in direct contrast to traditional methodology for manufacturing cellulose food casings. In the conventional viscose system, the extruded tube is discharged directly into a liquid bath with no air gap between the nozzle opening and the bath.

While we do not wish to be bound thereby, a possible explanation for this invention is that the increase in air path length allows the falling stream of nonderivatized cellulose-NMMO-water mixture to cool and to transition into a liquid crystalline phase, often called a mesophase. It is known in the art that parameters controlling this transition include cellulose concentration, cellulose molecular weight, solvent proportions and temperature. That is, a classical solution of cellulose in NMMO-water solution can be cooled to a point that the mesophasic transition begins to occur. This is determined by the formation of increased structure in the solutions when observed under a polarized light microscope. Additionally, it is known that a small diameter fiber drawn and regenerated from this mesophasic mixture has an x-ray powder diagram comparable to that of an otherwise identical cellulose fiber from the viscose process which has been subjected to mechanical orientation during the regeneration process as currently commercially practiced. This suggests that in making the transition to the mesophase or liquid crystalline state by the method of this invention, crystalline structure is imparted which is carried over into the finished article with limited mechanical orientation. This structure includes high transverse direction tensile strength which approximately matches the high machine direction tensile strength, i.e., a high and biaxially balanced tensile strength cellulose tube.

Figure 3:
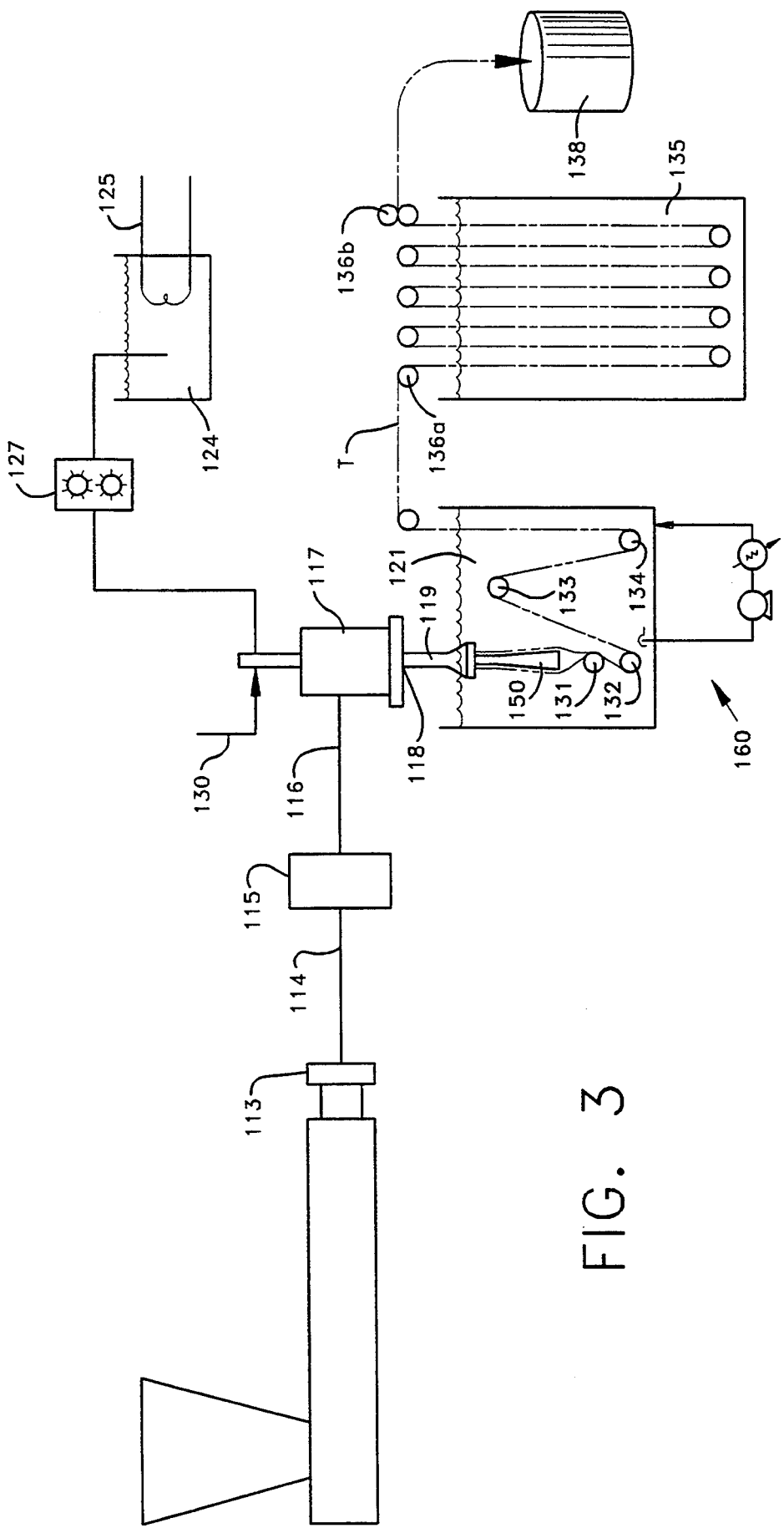
FIG. 3 is a schematic flowsheet drawing of a second pilot plant used to manufacture the NMMO-derived cellulose food casing described in Example 2.
Figures 4, 5:
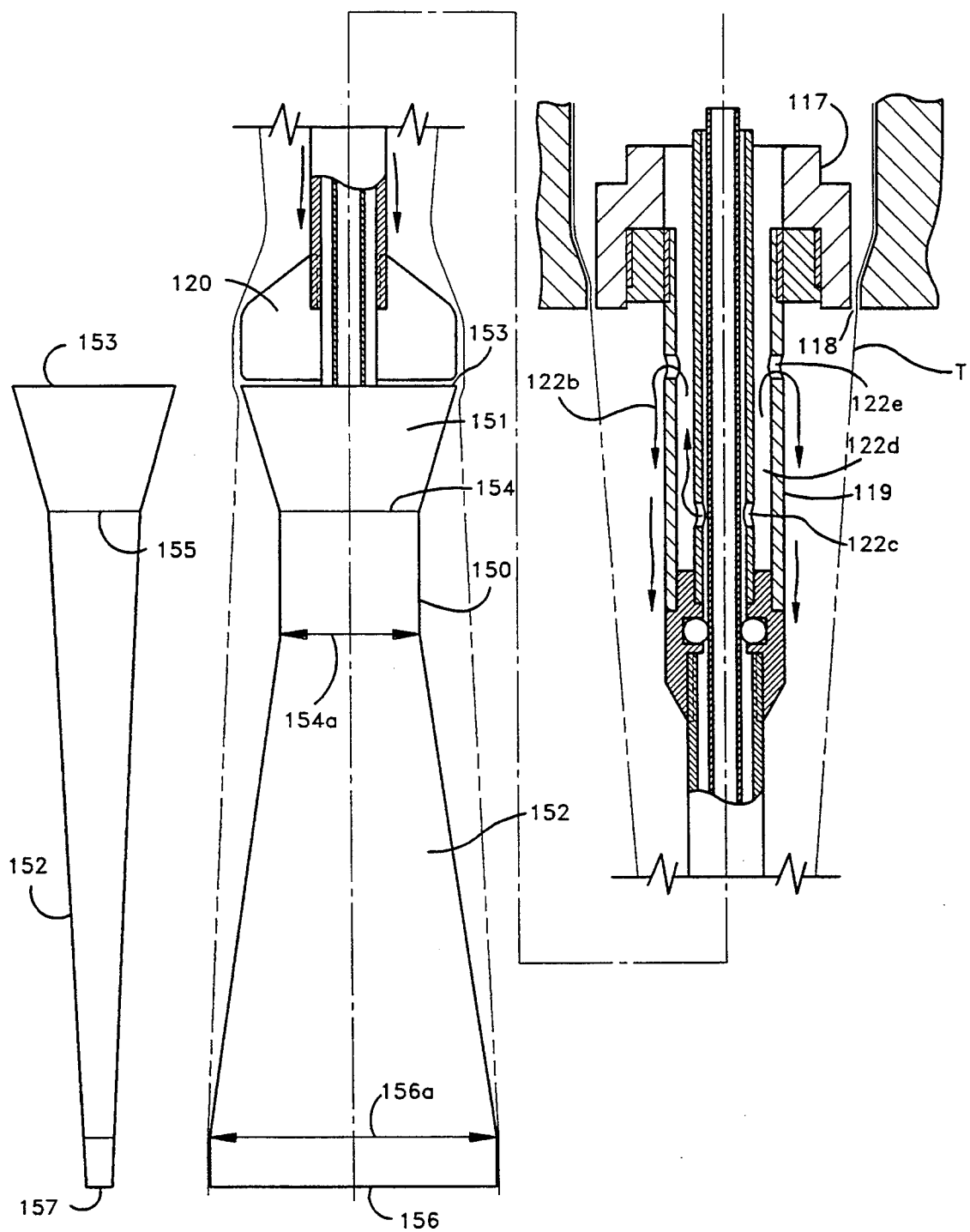
FIG. 4 is an enlarged elevation view taken in cross-section of the extruder-mandrel-first bath section of the FIG. 3 system.
FIG. 5 is side elevation view of the tube spreader-flattening element positioned at the discharge end of the FIG. 4 mandrel.

Another series of runs were made in a second pilot plant functionally similar to the FIG. 1 pilot plant but differing in certain respects. These differences are illustrated in FIGS. 3 and 4 as hereinafter described. Components corresponding to those in FIG. 1 are identified by the same numeral plus 100, and only the differences from the FIGS. 1–2 system are discussed.

The melt pump 115 is a Zenith PEP II type with a capacity of 5 cc/revolution. Also the pump is heated by hot water flowing through passages located on the top and bottom of the pump. The melt is transferred through screen pack 113 to melt pump 115 through conduit 114 which is also hot water heated. Similarly, conduit 116 transferring the pumped melt to die-mandrel assembly 117 is hot water heated.

FIG. 4 illustrates certain changes in the die 117-mandrel extension 119 assembly (from the FIG. 2 embodiment) to reduce the diameter of parts between die outlet 118 and the enlarged lower end 120 of the mandrel. The inside diameter of die opening 118 is changed from 0.866 inch (FIG. 1 and Example 1) to 0.75 inch. The respective outside diameters of the dies were 0.946 inch (Example 1) and 0.81–0.85 inch (Example 2). The mandrel 119 diameter is also reduced, from 0.625 inch to 0.375 inch. This also permitted a longer mandrel extension section and thus a longer air path length from the process standpoint. When it was attempted to use a larger than 6 inch air path length with the FIG. 2 embodiment the natural tendency of the molten dope to neck-in caused the extruded solution tube to contact the mandrel (and therefore contact the internal bath) prematurely. However, this problem was avoided with the FIG. 4 embodiment, i.e. the smaller diameter mandrel permitted dope neck-in without prematurely touching the mandrel. Still another advantage of the FIG. 4 embodiment is that the enlarged mandrel lower end can be reduced in diameter, and this in turn permits the manufacture of smaller flat width tube product. By way of illustration, if a 6 inch air gap length is desired with the FIG. 2 mandrel, the enlarged lower end must be about 1.5 inches because of the tube neck-in tendency. But with the smaller diameter FIG. 4 mandrel the diameter of the enlarged lower end 120 of the mandrel need only be on the order of 1.1–1.25 inches. The smaller diameter mandrel 119 was accomplished by raising the level of transverse orifices 122 c to be closer to the internal bath-air outlet orifices 122e so that the length of passage 122d between the orifices 122c and 122e is shortened.

Beneath the enlarged lower end 120 of the mandrel, element 150 is attached to flatten and spread tube T in first bath 121 before it reaches first roll 131. Flattening-spreading element 150 is illustrated in the FIG. 4 front view and the FIG. 5 side view oriented 90 degrees from the front view. Element 150 has a conical first upper section 151 and a blade-like second lower section 152. Referring first to FIG. 4, conical section 151 upper end diameter 153 is 1.22 inches and lower end width 154 is 0.75 inch. In side view FIG. 5, the upper end diameter 153 is also 1.22 inches but the lower end width 155 is only 0.52 inch.

Referring now to the blade-like lower section 152, the upper end of this section as shown in FIG. 4 has the same width 154 for a vertical length of 0.83 inch and then this width increases to a front lower end width 156a of about 1.65 inches for the final vertical length of 0.37 inch to mouth 156. The FIG. 5 side view shows that lower section 152 tapers to a very narrow lower end 157 width of about 0.04 inch thereby forming blade mouth 156. This configuration of flattening-spreading element 150 was quite effective in preventing wrinkles in tube T as it was reshaped for flattening in first bath 121.

The internal bath 122b comprises 70% water and 30% NMMO and is provided at 45° F. The first bath 121 (FIG. 3) operates in substantially the same manner as FIG. 1 but with a tachometer added to measure and control the roll speed. The four rolls operate at the same speed and in the range of 16–60 feet per minute, depending on the run. A typical first bath composition is 15% NMMO and 85% water, and the bath temperature is controlled by recirculation heating-cooling system 160. For the Example 2 tests, the first bath temperature was typically about 95° F.

Second bath 135 is significantly different from Example 1. There are sufficient rolls for four (instead of three) dips for tube T and the tank has a capacity of at least 300 gallons. Only water is used in the bath, and in a temperature range of 95°–120° F. Five of the rolls, located at the "top" of the dips, are individually motor driven and speed controlled. The four bottom rolls are freely rotating. The speed of the first roll 136a is matched to the speed of the first bath rolls 131–134, for example 40 fpm. However within the second bath 135 there is usually a one percent increase in the speed of each subsequent roll. This maintains a machine direction tension in tube T. The last roll 136b in second bath 135 is a nip roll.

The Example 2 samples were washed in quiescent bath 138 which is temperature controlled, and a temperature of 110° F. was typically used. For drying, samples about 12 feet in length are each hung vertically in a drier and a 400 gram weight is hung from bottom of the sample to provide machine direction tension. Air at about 200° F. flows upwardly through the drier, and drying time is reduced to about 15 minutes. The inflation air pressure is determined by the desired transverse direction orientation (TDO) and air pressure range from 45 to 100 inches of water for TDO targets of 1.5 to 2.0.

As will be explained hereinafter in more detail, it has also been discovered that under certain draw ratio conditions and TDO values of between about 1.6 and about 1.9, the resulting nonderivatized cellulose tube will have machine direction (MD) and transverse direction (TD) tensile strengths above about 3.0 lbs/inch/mil thickness.

EXAMPLE 2

Sixty-eight runs based on operation of the FIG. 2 second plant are described. Some of these runs are based on actual operating data and are identified in Table B by the letter "A" following the run number. Another group of runs are computer simulations based on certain parameters of an operating run, in particular the same values for the temperature of the nonderivatized cellulose-NMMO-water melt discharged from the extruder, dry film thickness, die gap, extrusion output, draw ratio and transverse direction orientation (TDO) but a simulated air path length. This group of computer-simulated runs are identified by letter "C" following the run number. A third group of runs identified by letter "CC" are computer simulations also based on actual data but selected at the same air path length, dope temperature, die gap, extrusion output, draw ratio, TDO, and dry film thickness as the immediately preceding actual run. The purpose of the latter is to compare the computer simulation with actual data and check the former's validity in terms of MD and TD tensile strengths.

By way of illustrating the above-described run parameter selection, the first group of runs comprising 6–10 are based on 204° F. dope temperature, 0.83 mils dry flat width, 30 mil. die gap opening, 5 draw ratio and 1.55 TDO. The actual run is 8A with an air path length of 10.0 inches. Runs 6C, 7C and 10C are computer simulations at air path lengths of 3.0, 6.0 and 12.5 inches respectively. Run 9CC is a computer simulation of run 8A to check the former's validity.

TABLE B

| Run No.[1] | Air Path Length Ins. | Dope Temp. Deg. F | Dry Film Thk. Mils | MD Str. Pim | TD Str. Pim | Ratio MD/TD | Die Gap Mils. | Die Output Lbs/Hr | Draw Ratio | TDO |
|---|---|---|---|---|---|---|---|---|---|---|
| 6C | 3.0 | 204 | 0.83 | 4.95 | 0.96 | 5.16 | 30 | 20 | 5 | 1.55 |
| 7C | 6.0 | 204 | 0.83 | 4.71 | 1.21 | 3.89 | 30 | 20 | 5 | 1.55 |
| 8A | 10.0 | 204 | 0.83 | 3.85 | 2.08 | 1.85 | 30 | 20 | 5 | 1.55 |
| 9CC | 10.0 | 204 | 0.83 | 4.36 | 2.07 | 2.10 | 30 | 20 | 5 | 1.55 |
| 10C | 12.5 | 204 | 0.83 | 4.16 | 2.24 | 1.86 | 30 | 20 | 5 | 1.55 |
| 11C | 3.0 | 200 | 0.83 | 4.40 | 1.36 | 3.23 | 40 | 20 | 6 | 1.71 |
| 12C | 6.0 | 200 | 0.83 | 4.02 | 1.71 | 2.35 | 40 | 20 | 6 | 1.71 |
| 13A | 9.7 | 200 | 0.83 | 3.68 | 2.22 | 1.66 | 40 | 20 | 6 | 1.71 |
| 14CC | 9.7 | 200 | 0.83 | 3.53 | 2.18 | 1.62 | 40 | 20 | 6 | 1.71 |
| 15C | 12.7 | 200 | 0.83 | 3.17 | 2.52 | 1.26 | 40 | 20 | 6 | 1.71 |
| 16C | 3.0 | 215 | 0.82 | 2.94 | 2.62 | 1.12 | 50 | 19.7 | 5 | 2.19 |
| 17A | 6.4 | 215 | 0.82 | 2.88 | 2.41 | 1.20 | 50 | 19.7 | 5 | 2.19 |
| 18C | 3.0 | 215 | 0.80 | 3.04 | 2.88 | 1.06 | 50 | 16.5 | 5 | 2.19 |
| 19A | 9.7 | 215 | 0.80 | 3.34 | 2.69 | 1.24 | 50 | 16.5 | 5 | 2.19 |

TABLE B-continued

| Run No.[1] | Air Path Length Ins. | Dope Temp. Deg. F | Dry Film Thk. Mils | MD Str. Pim | TD Str. Pim | Ratio MD/TD | Die Gap Mils. | Die Output Lbs/Hr | Draw Ratio | TDO |
|---|---|---|---|---|---|---|---|---|---|---|
| 20C | 3.0 | 216 | 0.81 | 3.81 | 2.35 | 1.63 | 30 | 20 | 4 | 1.81 |
| 21A | 9.7 | 216 | 0.81 | 3.82 | 2.95 | 1.29 | 30 | 20 | 4 | 1.81 |
| 22C | 3.0 | 216 | 0.88 | 3.09 | 2.43 | 1.27 | 40 | 20 | 5 | 1.87 |
| 23A | 9.5 | 216 | 0.88 | 3.14 | 3.26 | 0.88 | 40 | 20 | 5 | 1.87 |
| 24C | 3.0 | 216 | 0.88 | 3.00 | 2.81 | 1.07 | 40 | 20 | 5 | 2.02 |
| 25A | 9.5 | 216 | 0.88 | 2.98 | 3.39 | 0.88 | 40 | 20 | 5 | 2.02 |
| 26CC | 9.5 | 216 | 0.88 | 2.98 | 2.70 | 1.10 | 40 | 20 | 5 | 2.02 |
| 27C | 3.0 | 217 | 0.95 | 3.29 | 1.96 | 1.68 | 50 | 20 | 6 | 1.71 |
| 28A | 9.7 | 217 | 0.95 | 3.55 | 2.17 | 1.63 | 50 | 20 | 6 | 1.71 |
| 29C | 3.0 | 215 | 0.97 | 3.20 | 2.23 | 1.44 | 40 | 20 | 5 | 1.73 |
| 30A | 9.4 | 215 | 0.97 | 3.55 | 2.49 | 1.42 | 40 | 20 | 5 | 1.73 |
| 31CC | 9.4 | 215 | 0.97 | 3.39 | 2.68 | 1.26 | 40 | 20 | 5 | 1.73 |
| 32C | 3.0 | 215 | 0.90 | 2.86 | 2.67 | 1.07 | 50 | 20 | 5 | 2.12 |
| 33A | 12.5 | 215 | 0.90 | 2.98 | 2.69 | 1.11 | 50 | 20 | 5 | 2.12 |
| 34C | 3.0 | 215 | 0.92 | 2.78 | 3.11 | 0.89 | 40 | 20 | 4 | 2.04 |
| 35A | 12.7 | 215 | 0.92 | 2.78 | 3.18 | 0.87 | 40 | 20 | 4 | 2.04 |
| 36CC | 12.7 | 215 | 0.92 | 3.07 | 3.18 | 0.97 | 40 | 20 | 4 | 2.04 |
| 37C | 3.0 | 217 | 1.18 | 2.71 | 0.19 | 14.26 | 40 | 30 | 5 | 1.46 |
| 38A | 6.9 | 217 | 1.18 | 2.50 | 1.34 | 1.87 | 40 | 30 | 5 | 1.46 |
| 39CC | 6.9 | 217 | 1.18 | 2.90 | 1.06 | 2.73 | 40 | 30 | 5 | 1.46 |
| 40C | 3.0 | 215 | 1.19 | 3.27 | 2.29 | 1.43 | 50 | 19.7 | 5 | 1.64 |
| 41A | 6.4 | 215 | 1.19 | 3.28 | 2.16 | 1.52 | 50 | 19.7 | 5 | 1.64 |
| 42C | 3.0 | 215 | 1.06 | 3.21 | 2.06 | 1.56 | 40 | 20 | 5 | 1.58 |
| 43A | 9.6 | 215 | 1.06 | 3.57 | 2.83 | 1.26 | 40 | 20 | 5 | 1.58 |
| 44C | 3.0 | 217 | 1.14 | 2.80 | 2.89 | 0.97 | 50 | 20 | 4 | 1.96 |
| 45A | 9.7 | 217 | 1.14 | 3.40 | 2.91 | 1.16 | 50 | 20 | 4 | 1.96 |
| 46C | 3.0 | 215 | 1.17 | 3.05 | 3.38 | 0.90 | 50 | 16.5 | 5 | 1.67 |
| 47A | 9.7 | 215 | 1.17 | 3.34 | 2.69 | 1.24 | 50 | 16.5 | 5 | 1.67 |
| 48C | 3.0 | 217 | 1.19 | 2.80 | 1.11 | 2.52 | 50 | 30 | 5 | 1.65 |
| 49A | 9.7 | 217 | 1.19 | 3.34 | 2.37 | 1.41 | 50 | 30 | 5 | 1.65 |
| 50CC | 9.7 | 217 | 1.19 | 4.14 | 2.29 | 1.81 | 50 | 30 | 5 | 1.65 |
| 51C | 3.0 | 232 | 0.85 | 2.49 | 1.08 | 2.31 | 30 | 20 | 5.0 | 1.4 |
| 52C | 6.0 | 232 | 0.85 | 3.10 | 1.64 | 1.89 | 30 | 20 | 5.0 | 1.4 |
| 53A | 9.7 | 232 | 0.85 | 3.97 | 2.84 | 1.40 | 30 | 20 | 5.0 | 1.4 |
| 54CC | 9.7 | 232 | 0.85 | 3.75 | 2.50 | 1.88 | 30 | 20 | 5.0 | 1.4 |
| 55A | 12.7 | 232 | 0.85 | 4.50 | 2.91 | 1.55 | 30 | 20 | 5.0 | 1.4 |
| 56C | 3.0 | 230 | 0.92 | 1.94 | 1.95 | 1.00 | 40 | 20 | 6.1 | 1.51 |
| 57C | 6.0 | 230 | 0.92 | 2.50 | 2.11 | 1.18 | 40 | 20 | 6.1 | 1.51 |
| 58A | 9.6 | 230 | 0.92 | 3.61 | 3.06 | 1.18 | 40 | 20 | 6.1 | 1.51 |
| 59CC | 9.6 | 230 | 0.92 | 3.17 | 2.61 | 1.21 | 40 | 20 | 6.1 | 1.51 |
| 60C | 12.7 | 230 | 0.92 | 3.15 | 3.04 | 1.04 | 40 | 20 | 6.1 | 1.51 |
| 61C | 3.0 | 230 | 0.92 | 2.21 | 2.37 | 0.93 | 50 | 20 | 5 | 1.76 |
| 62C | 6.0 | 230 | 0.92 | 2.77 | 2.72 | 1.02 | 50 | 20 | 5 | 1.76 |
| 63A | 9.9 | 230 | 0.92 | 3.52 | 3.39 | 1.04 | 50 | 20 | 5 | 1.76 |
| 64CC | 9.9 | 230 | 0.92 | 3.46 | 3.01 | 1.15 | 50 | 20 | 5 | 1.76 |
| 65C | 12.7 | 230 | 0.92 | 4.02 | 3.24 | 1.24 | 50 | 20 | 5 | 1.76 |
| 66C | 3.0 | 230 | 1.04 | 2.08 | 2.52 | 0.83 | 40 | 20 | 5.0 | 1.65 |
| 67A | 7.2 | 230 | 1.04 | 2.70 | 2.81 | 0.96 | 40 | 20 | 5.0 | 1.65 |
| 68C | 3.0 | 230 | 1.12 | 1.68 | 0.65 | 2.58 | 40 | 30 | 5.1 | 1.56 |
| 69C | 6.0 | 230 | 1.12 | 2.24 | 1.32 | 1.70 | 40 | 30 | 5.1 | 1.56 |
| 70A | 9.9 | 230 | 1.12 | 2.95 | 2.12 | 1.39 | 40 | 30 | 5.1 | 1.56 |
| 71CC | 9.9 | 230 | 1.12 | 2.96 | 2.18 | 1.35 | 40 | 30 | 5.1 | 1.56 |
| 72C | 3.0 | 230 | 1.03 | 2.06 | 2.44 | 0.83 | 40 | 20 | 5.0 | 1.62 |
| 73A | 12.1 | 230 | 1.03 | 3.49 | 3.10 | 1.03 | 40 | 20 | 5.0 | 1.62 |

[1] In the run numbering the letter "A" means actual data, "C" means computer simulations based on the actual data, and "CC" means computer simulations based on actual data and specifically based on the same air length, dope temperature and dry film thickness as the immediately preceding actual run.
[2] Cellulose flow rate is 15% die output.

The experiments to confirm these relationships were done by currently well accepted methods of statistical experimental design (SED). This method of studying multivariate systems uses multiple factor experimentation coupled with statistical analysis of the data to obtain equations that relate the dependent and independent variables. Standard full or partial factorial or response surface designs were used to derive the relationships presented herein. These designs fit the experiments to the corners, faces and midpoints of multidimensional geometries in order to separate all single factor and two-factor interactions of the independent variables with the dependent variables. Higher order interactions were not estimated, and this is within the bounds of standard accepted practice. However, this method of developing data does not give the incremental types of examples that "one at a time" experimentation yields. For this reason, as discussed below, models were developed and used to estimate the values for those experiments that were not actually done.

To restate the above explanation and simplify its understanding, a response surface (Box-Benkhen) experimental design of three variables at three levels each is shown in Table C. The variables are x, y and z and the levels are "+1" (high), "0" (midpoint) and "−1" (low).

TABLE C

A Box-Benkhen Design For Three Variables at Three Levels

| EXPMT. NO. | X | Y | Z |
|---|---|---|---|
| 1 | 0 | + | + |
| 2 | 0 | + | − |

TABLE C-continued

A Box-Benkhen Design For Three Variables at Three Levels

| EXPMT. NO. | X | Y | Z |
| --- | --- | --- | --- |
| 3 | 0 | − | + |
| 4 | 0 | − | − |
| 5 | + | 0 | + |
| 6 | + | 0 | − |
| 7 | − | 0 | + |
| 8 | − | 0 | − |
| 9 | + | + | 0 |
| 10 | + | − | 0 |
| 11 | − | + | 0 |
| 12 | − | − | 0 |
| 13 | 0 | 0 | 0 |
| 14 | 0 | 0 | 0 |

By way of illustration, for Experiment No. 1, x at a midpoint level, y at the high and z at the high level would be used. For the present invention, an analogous design was used except five factors were varied over three levels so that the design was more complex (52 experiments).

The experimental data were analyzed by using computer assisted analysis of variance (ANOVA) to estimate the coefficients for the modelled equations relating the dependent variables to the independent variables. These models were developed using widely accepted statistical concepts and parameters and were then used to calculate estimated values for the dependent variables. The tables show many examples of actual experimental runs, and also values estimated from this empirical data by using the modelled equations.

From the foregoing, the equation for TD tensile strength is as follows:

TD tensile strength equation (1) = −16.1268+

$0.1824p + 0.4953q − 0.3295r + 0.02185s$ $0.2114t + 8.165u + 10.3947g + 0.0066pr$ $0.1235pu − 0.1097pg + 0.0166qr − 0.2457qu$ $0.3469qg − 0.1447rg$ p = die gap width, mils
q = air path length, inches
r = dope output rate, lbs/hr
s = dope temperature, ° F.
t = draw ratio
u = TDO
g = dry film thickness, mils In principle the aforedescribed procedure of computer-assisted statistical analysis can be used to test TD tensile strength Equation (1) for changes in air path length (q). As previously explained, according to the method of this invention, incremental increases in q cause increases in the cellulose tube's TD tensile strength. However, this is complicated because Equation (1) not only contains "q" but also interactions of "q" with dope output rate "r", TDO, "u" and dry film thickness "g". Therefore, all parts of Equation (1) containing any form of "q" can be factored out to give Equation (2).

TD tensile strength Equation (2) = f[q (0.4953

$+ 0.0166r − 0.2457u − 0.3469g)]$. For this relationship, the letter "f" indicates that there is a function rather than an equality.

The cofactor, Equation (3) represents the potential interaction of other variables with "q".

Equation (3) = $0.4953 + 0.0166r − 0.2457u$ $0.3469q$

This cofactor contains "r", "u", "g" and a constant and when either "q" or this cofactor is zero, there is no net change in TD tensile strength due to an increase in air path length. But if the cofactor is positive, then for a positive change in "q", an incremental positive change in TD strength occurs. Thus, the goal is to find which values of "r", "u" and "g" result in a positive value for the cofactor, Equation (3). This is a series of repeated calculations and can easily be done by the computer using a looping process. That is "r", "u" and "g" are set at discrete values and then Equation (3) is evaluated first at "$r_1$", "$u_1$", "$g_1$" then at "$r_2$", "$u_1$" and "$g_1$", then at "$r_3$", "$u_1$", and "$g_1$" and so forth until the equation has been evaluated for all of the desired discrete values of "r", "u" and "g". Those values for which Equation (3) is greater than zero represent the universe for which the inventive method can be advantageously practiced. Conversely, those values for which Equation (3) is less than zero represent the universe where the improvements of this invention cannot be realized.

Referring now to Table B summarizing the data from the Example 2 runs using the FIG. 3 second pilot plant and the aforedescribed computer simulations, it will be seen that the runs are grouped into different sets wherein for each set the following variables are consistent: dope temperature, dry film thickness, die gap width, die output, the die extrudate to nip roll draw ratio, and the transverse direction orientation (TDO). The latter is the ratio of the dry flat width of the hot air dried-transversely stretched tube to the dry flat width of the as-extruded tube. For a particular run set, the only variable was the air path length, so its effect on the tube tensile strength properties could be directly determined by measuring the MD and TD strength. A total of six samples were tested for each of the two directions for each empirical run, and the results arithmetically averaged. Tensile strengths were measured in accordance with the aforedescribed procedure.

In general, the run sets are arranged with lowest dope temperature, dry film thickness, die gap and draw ratio first. For example, in the run set comprising runs 6–10, the dope temperature is only 204° F., the film thickness is 0.83 mils, the die gap is 30 mils, the die output is 20 lbs/hr, the draw ratio is 5 and the TDO is 1.55. Even under this set of conditions approaching the lower limits of the instant method, a substantial improvement in TD tensile strength and reduced MD/TD ratio is realized when the air path length is increased from 3.0 to 6.0 inches. Further improvement is achieved when the air path length is increased to 10.0 inches or 12.5 inches. Examination of comparative simulated run 9CC with actual run 8A indicated close agreement in terms of TD tensile strength.

The set comprising runs 11–15 provided slightly better results than run set 6–10 even though the dope temperature was slightly cooler at 200° F. This was probably due to the larger die gap (40 mil), higher draw ratio (6) and TDO (1.71). Comparison of computer simulated run 14CC with actual run 13A indicates close agreement in terms of TD tensile strength.

Run set 24–26 with 216° F. dope temperature shows substantial improvement in actual run 25A at 9.5 inches air compared with computer run 24C at 3.0 inches air path length, although computer simulation 26CC also at 9.5 inches air path shows no improvement. This anomaly is not understood. Similar run set 29–31 with larger cellulose tube dry film thickness (0.97 rs. 88 mil) and lower TDO (1.73 rs. 2.02) shows improved TD tensile strength at 9.4 rs. 3.0 inches air path length, and reasonably close correlation between computer simulated run 31CC and actual run 30A.

Run set 34–36 at 40 mil die gap and 4 draw ratio shows slight improvement in TD tensile strength at 12.7 inches rs. 3.0 inches air path length. Run set 37–39 shows that by increasing the output from 20 to 30 lbs/hr and the draw ratio to 5, all TD tensile strengths are reduced relative to run set 34–36. The very low value of computer run 37C at 3 inches in path length is probably an anomaly. This is because run set 42–43 at similar conditions shows a TD tensile strength value at 3 inches which is more similar to other comparable runs, but invention embodiment actual run 43A at 96 inches air path provides substantially higher TD tensile strength and lower MD/TD ratio.

Run set 48–50 at relatively large dry film thickness (1.19 mil) and large die gap width (50 mm) shows substantial improvement for 9.7 inches air path length rs. 3.0 inches, and good correlation of computer simulated comparison run 50CC with actual run 49A.

At the high end of the operable die temperature range, run set 51–55 for 0.85 mil dry film thickness shows substantial improvement for three different air path lengths of 6.0, 9.7 and 12.7 inches compared with 3 inches. Computer simulated comparative run 54CC shows reasonably good correlation of TD tensile strength at 9.7 inches with actual run 53A. The same is true for run set 56–60 with slightly thicker film, larger die gap width, higher draw ratio and higher TDO.

In run set 61–65 with high dope temperature (230° F.) and relatively large die gap of 50 mil., increasing air path length from 3.0 inches to 6.0, 9.9 and 12.7 inches substantially and progressively increases TD tensile strength. Moreover, the MD tensile strength also progressively and substantially increases so the MD/TD ratio increases rather than decreases. In similar run set 68–71 with larger film thickness (1.12 rs. 0.92 mil), the die gap width was decreased (from 50 to 40 mil) and the output was increased (from 20 to 30 lbs/hr). Again there is a substantial improvement in TD tensile strength when the air path length is increased from 3.0 to 6.0 and 9.9 inches, and the MD/TD ratio decreases because the MD tensile strength did not increase as much as in run set 61–65. There is good correlation between simulated comparison run 71CC and actual run 70A.

The various sets of runs in Table B may also be examined from the standpoint of the effect of increasing the air path length above 6 inches, the threshold for achieving the substantially higher transverse direction tensile strength characteristic of this invention. It will be recognized from Table B that in general, longer air path length provides higher tensile strength and lower MD/TD ratio hence a more balanced tube tensile strength, all other key parameters being constant. For example, this is illustrated for run sets 7C–10C, 12C–15CC, 52C–55A, 57C–60C, 62C–65C and 69C–71CC wherein air path lengths between 6.0 inches and 12.7 inches were examined. Further, it appears that the magnitude of absolute numerical increases in cellulose tube TD tensile strength by incremental increases in air path length is determined by the interaction of this length with three other cellulose tube manufacturing method parameters: the dope output from the extruder, TDO and dry film thickness. In particular, the absolute improvement in tube TD strength increases with increasing extrusion output above about 20 lbs/hr., TDO values above about 1.4 and dry film thickness above about 0.80 mils thick.

On an absolute basis, increasing air path length above 6 inches has the effect of substantially increasing a cellulose tube's TD strength but has relatively little effect on the tube's MD strength. For certain combinations of parameters (set forth in particular run sets of those listed above), increasing air path lengths reduces tube MD strength. Accordingly, the optimum air path length for any particular embodiment of the method of this invention provides relatively higher and balanced MD and TD tensile strengths wherein the MD/TD ratio preferably does not exceed about 2 and most preferably does not exceed about 1.5.

With respect to die gap openings, the Tables A and B data is in the 30–50 mil width range, but other data indicates that lower and higher die gaps may be used in the method of this invention. In general, narrower die gaps are preferred with lower dope throughputs, and conversely higher die gaps are preferred with higher dope throughputs. It should be understood however that in the practice of this invention, dope throughput and die gap should be balanced to obtain the highest possible draw ratio.

It will be noted that in the method of this invention, the TD tensile strength improvement by use of at least about 6 inches air path length is realized when the dope is extruded through a die gap at flow output of at least about 20 lbs/hr. When substantially lower outputs are used as for example 10 lbs/hr, air gap lengths on the order of 3 inches result in tubes having relatively high TD tensile strength and relatively little improvement is realized when the air path length is increased to at least about 6 inches. This is probably because the relatively slow movement of the molten tube through the air gap allows sufficient time for transition to the mesophase or liquid crystalline state, without the increased air path length of the present invention.

Although the invention has been specifically described in connection with NMMO, other tertiary amine N-oxides may be used in the dope as for example those listed in Table D.

TABLE D

Examples Of Tertiary Amine

N-Oxide Solvents

Tertiary Amine N-Oxide
N-methylmorpholine N-oxide
N,N-dimethylethanolamine N-oxide
N,N-dimethylcyclohexylamine N-oxide
N-methylhomopiperidine N-oxide
N,N,N,-triethylamine N-oxide
2(2-hydroxypropoxy)-N-ethyl-N,N-dimethylamine N-oxide
N-methylpiperidine N-oxide
N,N.-dimethylbenzylamine N-oxide Although preferred embodiments of this invention have been described in detail, it is contemplated that modifications thereof may be made and that some preferred features maybe employed without others, all within the spirit and scope of the broad invention.

What is claimed is:

1. A method for forming a seamless cellulose tubular film of non derivatized cellulose having a wall thickness of about 0.80 mils to about 1.20 mils and suitable for use as a food casing comprising:
   a) downwardly extruding from an annular die gap a solution of non derivatized cellulose, tertiary amine N-oxide cellulose solvent and water at a temperature below about 240° F. at a flow rate of at least 20 lb/hr and at least 2 lb/hr cellulose on a bone dry basis, the solution being extruded in the form of a tube;
   b) said downwardly extruding being through an air length and directly into a water bath, the air length as measured from the annular die gap to the surface of the water bath being about 6 to 12 inches;
   c) internally cooling said tube of extruded solution in said air length;
   d) drawing the tube of extruded solution consecutively from the die gap through the air length and the water bath at a draw ratio of at least three;
   e) in the water bath removing the tertiary amine N-oxide solvent from the extruded tube to form a substantially solvent-free wet tube of non derivatized cellulose; and
   f) inflating and drying said wet tube of non derivatized cellulose while longitudinally and transversely expanding it to form said seamless cellulose tubular film with high transverse direction tensile strength.

2. A method according to claim 1 wherein the transverse direction tensile strength of the seamless cellulose tubular film is at least 2.0 lbs/in·mil.

3. A method according to claim 1 wherein the transverse direction tensile strength of the seamless cellulose tubular film is at least about 2.5 lbs/in·mils.

4. A method according to claim 2 wherein the ratio of machine direction to transverse direction tensile strength of said seamless cellulose tubular film does not exceed about 2.

5. A method according to claim 2 wherein the ratio of machine direction to transverse direction tensile strength of said seamless cellulose tubular film does not exceed about 1.5.

6. A method according to claim 1 wherein the die gap is between about 30 and about 50 mils wide.

7. A method according to claim 1 wherein said solution is extruded at temperature between about 200° F. and about 240° F.

8. A method according to claim 1 wherein said solution is extruded at a temperature of between about 205° F. to 235° F.

9. A method according to claim 1 wherein said tube of extruded solution is internally cooled by cocurrently flowing nonsolvent cold liquid.

10. A method according to claim 9 wherein said nonsolvent liquid is water.

11. A method according to claim 1 wherein said tertiary amine N-oxide is N-methylmorpholine N-oxide.

* * * * *